United States Patent

Peyre et al.

[11] Patent Number: 5,896,765
[45] Date of Patent: Apr. 27, 1999

[54] MOTORIZED LOCKING DEVICE FOR A MOTOR VEHICLE, SUCH AS A STEERING LOCK, HAVING IMPROVED MEANS FOR LIMITING THE COURSE OF TRAVEL OF THE BOLT

[75] Inventors: Jean Peyre, Sevres; Olivier Demouy, Paris; Arnaud Humbert, Creteil; Pascal Alliot, Rosny sur Seine, all of France

[73] Assignee: Valeo Securite Habitacle, Creteil, France

[21] Appl. No.: 08/847,795

[22] Filed: Apr. 28, 1997

[30] Foreign Application Priority Data

Apr. 29, 1996 [FR] France .................... 96 05484

[51] Int. Cl.⁶ .................................... B60R 25/02
[52] U.S. Cl. ................. 70/186; 70/275; 292/144
[58] Field of Search .............. 70/182–189, 252, 70/275, 277–283, DIG. 42; 292/144, 201

[56] References Cited

U.S. PATENT DOCUMENTS

| 1,456,922 | 5/1923 | Flynn | 70/186 |
|---|---|---|---|
| 1,515,752 | 11/1924 | Randolph | 70/185 |
| 1,614,623 | 1/1927 | Matthiesen | 70/185 |
| 1,644,922 | 10/1927 | Hershey | 70/185 |
| 1,668,395 | 5/1928 | Carpenter | 70/186 |
| 4,262,504 | 4/1981 | Inoue | 292/144 X |
| 4,903,511 | 2/1990 | Niedzielski et al. | 70/184 X |
| 4,949,562 | 8/1990 | Thorncraft et al. | 70/277 |
| 5,033,282 | 7/1991 | Gartner et al. | 70/278 |
| 5,473,922 | 12/1995 | Bair et al. | 292/144 X |
| 5,694,798 | 12/1997 | Nunez et al. | 70/275 |
| 5,715,715 | 2/1998 | Nunez | 70/275 |

FOREIGN PATENT DOCUMENTS

| 36 31 163 | 3/1988 | Germany . |
|---|---|---|
| 37 39 172 | 2/1989 | Germany . |

*Primary Examiner*—Suzanne Dino Barrett
*Attorney, Agent, or Firm*—Morgan & Finnegan, LLP

[57] ABSTRACT

A motor vehicle has a motorized steering lock including a bolt which locks the steering column by engaging in a recess in the steering shaft in the column. The bolt is actuated by an internally threaded slider which is carried on an externally threaded drive rod, and which cooperates with abutment surfaces formed on the bolt so as to displace the latter between its locking and unlocking positions. Besides its threaded portion, and in extension of the latter, the drive rod has a portion of reduced diameter such that, when the drive rod is rotated, the slider can slide axially along the portion of the drive rod having the reduced diameter, to a position in which its internal thread is out of mesh with the external thread of the drive rod.

9 Claims, 1 Drawing Sheet

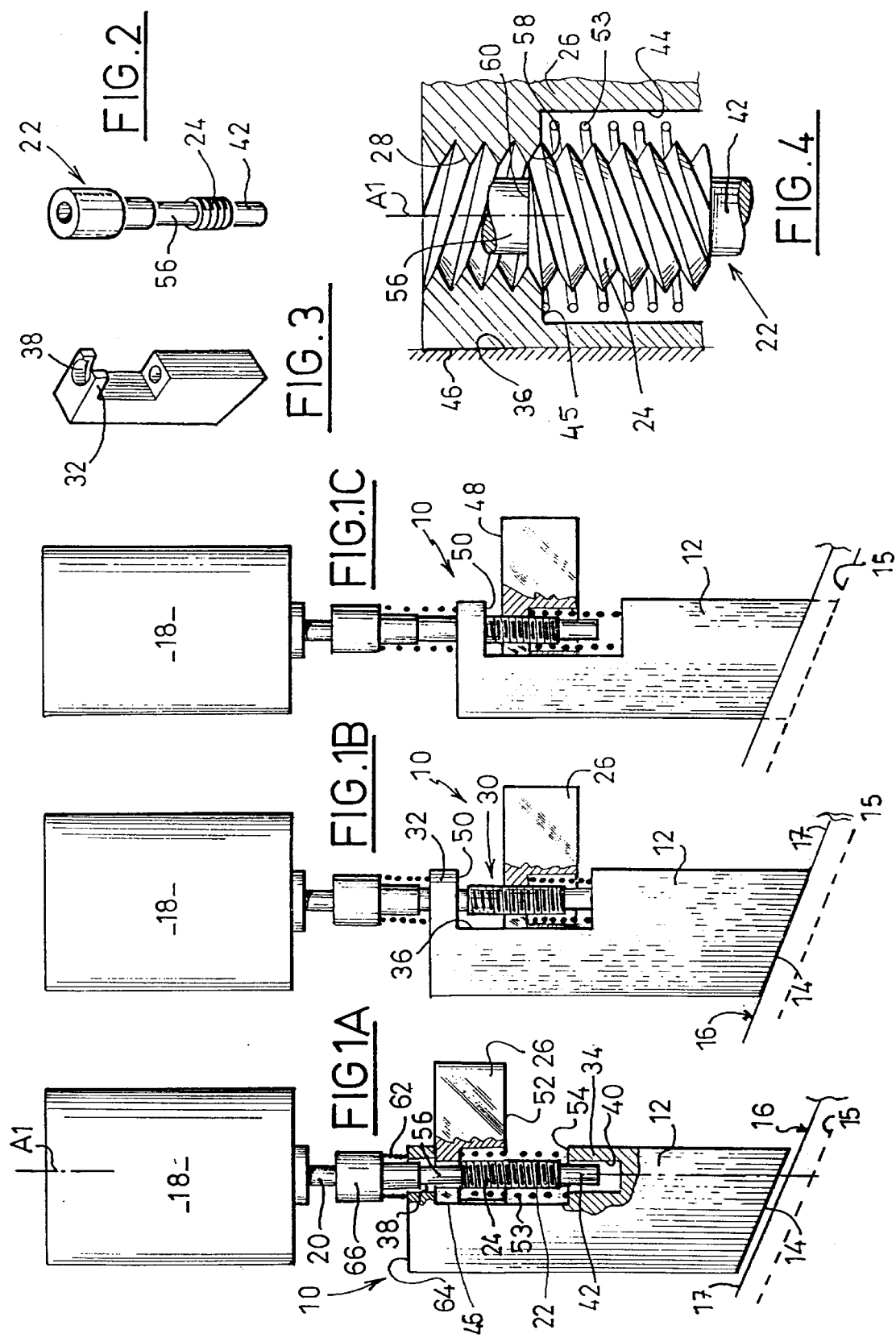

MOTORIZED LOCKING DEVICE FOR A MOTOR VEHICLE, SUCH AS A STEERING LOCK, HAVING IMPROVED MEANS FOR LIMITING THE COURSE OF TRAVEL OF THE BOLT

FIELD OF THE INVENTION

This invention relates in general terms to motorised locking devices, such as steering locks, for motor vehicles. In particular, it relates to such locking devices which include a displaceable bolt, with means whereby the course of travel of the bolt can be limited.

More particularly, the invention is concerned with a motorised locking device, or steering lock, for immobilising the steering of a motor vehicle having a steering column that includes a transmission shaft which is formed with recesses. The steering lock prevents rotation of the transmission shaft.

In this connection, the particular type of steering lock referred to is one in which the bolt is arranged for sliding movement between a lower position which is a locking position, and an upper position which is an unlocked position. In the locking position the bolt is received at least partially in a recess of the steering column transmission shaft so as to immobilise the latter against rotation about its axis. In the unlocked position of the bolt, the bolt is disengaged from the recesses. The locking device is further of the type in which the bolt is actuated by an electric motor through a threaded drive rod which is parallel to the direction of sliding movement of the bolt, and on which a threaded control slider is mounted, the slider being immobilised against rotation about the axis of the drive rod, so that rotational movement of the drive rod causes the slider to be displaced in straight-line movement along the axis of the drive rod. The locking device is, still further, of the type in which the slider is arranged to cooperate with either a locking abutment or an unlocking abutment of the bolt, in order to displace the bolt towards its locked position and its unlocked position, respectively.

BACKGROUND OF THE INVENTION

In such locking devices, the locked and unlocked positions of the bolt are generally determined by simply stopping the electric motor that rotates the drive rod. This may for example be achieved by the provision of interrupters which are actuated, for example, by a cam which is coupled to the bolt, and which transmits pulses to an electronic circuit for controlling the motor. This circuit then cuts off the power supply to the motor.

However, between the instant at which the power supply to the motor is cut off and the effective cessation of rotation of the motor shaft, a time interval elapses. It is difficult to forecast the duration of this time interval, which depends, in particular, on the inertia of the moving parts of the motor and on various friction effects that occur within the locking device. Accordingly, there is always some uncertainty as to the effective unlocked position of the bolt, and this disadvantage is amplified by the fact that this position varies every time the motor is stopped.

DISCUSSION OF THE INVENTION

An object of the invention is to provide a design for a locking device of the type described above, in which the position in which the bolt has stopped can be controlled with sufficient precision to ensure, with absolute certainty, that this position lies within a very narrow predetermined range.

According to the invention, a motorised locking device for immobilising a motor vehicle steering column against rotation, the steering column including a transmission shaft having recesses, the locking device being of the type in which: a bolt is arranged to slide between a lower, locked, position in which it is received at least partially in a recess of the said shaft so as to immobilise the latter against rotation about its axis, and an upper, unlocked, position in which it is disengaged from the recesses; displacement of the bolt is effected by an electric motor through an interposed threaded drive rod which is oriented parallel to the direction of sliding movement of the bolt; a control slider, having an actuating thread, is mounted on the threaded drive rod, the said slider being immobilised against rotation so that rotation of the drive rod causes the slider to perform a straight-line movement along the axis of the drive rod; and the slider is adapted to cooperate with a locking abutment or an unlocking abutment of the bolt, so as to displace the bolt towards its locked and unlocked positions respectively, is characterised in that the drive rod has a threaded portion which is extended, from at least one of its axial ends, by a portion of the drive rod having a reduced diameter, in that, when the threaded drive rod is driven in a first direction of rotation, the slider is able to slide axially towards the portion of the drive rod having the reduced diameter until it reaches a disengaged position, in which the actuating thread of the slider is disengaged from the threaded portion of the drive rod, so that continued rotational movement of the drive rod in the first direction has no effect on the slider, whereby the slider then occupies a first end position corresponding to the locked position or the unlocked position of the bolt.

According to a preferred feature of the invention, the locking device further includes means which, when the slider is in its first end position, urge the slider resiliently into axial engagement against the threaded portion of the drive rod.

According to another preferred feature of the invention, the threaded portion of the drive rod is disposed below the portion of the latter having the reduced diameter, the disengaged position of the slider corresponds to the unlocked position of the bolt, and a compression spring is arranged between the upper face of the bolt and a radial collar, this collar being arranged on the drive rod above the said portion of reduced diameter of the latter, so that the compression spring urges the lower end of the actuating thread of the slider resiliently into axial abutment against the upper end of the threaded portion of the drive rod.

A resiliently deformable element is preferably interposed between the slider and the locking abutment of the bolt, this resiliently deformable element being deformed resiliently when the slider is driven towards its end position corresponding to the locking position of the bolt with the bolt out of register with the recesses in the steering shaft.

The said resiliently deformable element then urges the bolt into its locking position within a recess when the transmission shaft of the steering column is rotated about its axis so as to bring one of the said recesses in the transmission shaft into register with the bolt.

According to yet another preferred feature of the invention, the bolt is formed with a window which is defined between an upper plate element and a lower plate element of the bolt, the said plate elements extending at right angles to the direction of displacement of the bolt, each said plate element having a hole receiving the threaded drive rod, the slider being received between the upper plate element and the lower plate element so that the lower face of the upper plate element and the upper face of the lower plate element, these faces being in facing relationship with each other, constitute the unlocking abutment and the locking abutment respectively of the bolt in cooperation with the upper and lower faces, respectively, of the slider, a compression spring being disposed between the lower plate element of the bolt and the lower face of the slider.

The drive rod is preferably mounted coaxially at the end of the output shaft of the motor, the motor being arranged above the bolt.

Further features and advantages of the invention will appear more clearly on a reading of the following detailed description of a locking device in a preferred embodiment of the invention, which is given by way of non-limiting example only and with reference to the accompanying drawings.

BRIEF DESCRIPTION OF THE DRAWINGS

FIG. 1 consists of three parts, namely FIGS. 1A, 1B and 1C. Each of these is a diagrammatic view showing the main components of the locking device in accordance with the invention which is to be described. FIG. 1A shows the locking device in an unlocked position in which the bolt of the device is in its unlocked or disengaged position. FIG. 1B shows the bolt in an intermediate or prelocking position. FIG. 1C shows the bolt in a locked position.

FIG. 2 is a perspective view showing the threaded drive rod in the locking device of FIG. 1.

FIG. 3 is a perspective view of the bolt of the locking device shown in FIG. 1.

FIG. 4 is a view in longitudinal cross section, on an enlarged scale, showing a detail of FIG. 1 and illustrating the disengaged position of the slider when the bolt is in its unlocked position.

DESCRIPTION OF A PREFERRED EMBODIMENT OF THE INVENTION

The drawings show a motor vehicle steering lock in the form of a locking device 10, which is simplified in the drawings in the interests of clarity in illustrating the present invention.

The locking device 10 includes a bolt 12 which is adapted to slide longitudinally between an upper position shown in FIG. 1A, or unlocked position, and a locked or lower position shown in FIG. 1C. In this locked position, the bottom end 14 of the bolt 12 is received in a recess 15 formed in the side surface 17 of a steering or transmission shaft 16 of the steering column, so as to prevent any rotation of the steering shaft 16 about its axis (not shown). In the example shown in the drawings, the axis of the steering shaft 16 is oblique with respect to the longitudinal direction in which the bolt 12 slides.

The locking device 10 is of the motorised type, and to this end it includes an electric motor 18 which, in the embodiment shown in the drawings, is arranged above the bolt 12. The motor 18 has a motor shaft 20 defining an axis A1, which is disposed longitudinally and parallel to the axis along which the bolt 12 is displaced. Guide means (not shown) for the bolt 12 are also provided. These guide means generally take the form of a housing which is fixed to a fixed element, again not shown, of the structure of the vehicle.

The motor shaft 20 of the motor 18 is extended longitudinally downwards, towards the steering shaft 16, by a drive rod 22 which includes a threaded portion 24, on which a slider 26 is mounted. The slider 26 has an internal drive or actuating thread 28, which can be seen in FIG. 4 in particular.

The bolt 12 has a transverse window or notch 30 which extends longitudinally between two integral transverse plate elements of the bolt, namely an upper plate element 32 and a lower plate element 34. The window 30 is open laterally in three directions at right angles to the longitudinal direction of sliding movement of the bolt 12. The window 30 defines a vertical longitudinal face 36 between the upper plate element 32 and the lower plate element 34, within the bolt 12. The window 30 is so designed as to enable the slider 26 to be displaced in relative displacement in the longitudinal direction with respect to the bolt 12. In the example shown in the drawings, the disposition of the threaded drive rod 22 has been so chosen that the rod 22 extends through a longitudinal aperture 38 formed through the upper plate element 32 of the bolt, with the drive rod 22 extending longitudinally into the window 30.

The lower plate element 34 of the bolt has a longitudinal blind hole 40, in which the free lower end portion 42 of the threaded drive rod 22 is received when the bolt 12 is in its unlocked position shown in FIG. 1A.

As can be seen in the drawings, the internal thread 28 of the slider 26 only extends over an upper portion of the slider 26, and it is extended axially downwardly by a smooth bore 44 having an enlarged diameter, through which the lower end portion 42 of the threaded drive rod 22 passes.

The slider 26 has a side face 46 which is arranged facing towards the longitudinal face 36 of the window 30, and which is in engagement against the face 36, so that the bolt 12 prevents the slider 26 from rotating about the axis A1 of the threaded drive rod 22. Thus, when the threaded drive rod 22 is driven in rotation about its axis by the motor 18, the slider 26 is caused to move in longitudinal straight-line motion, the direction of which depends on the direction of rotation of the motor 18.

The slider 16 causes the bolt 12 to be displaced between its locked and unlocked positions. In this connection, when the slider 26 is displaced axially upwardly, with respect to the threaded drive rod 22, it comes into engagement, through its top face 48, against the bottom face 50 of the upper plate element 32 of the bolt 12. In this way, the slider carries the bolt 12 with it. The same applies when the bottom face 52 of the slider 26 comes into contact with the top face 54 of the lower plate element 34 of the bolt 12.

Thus, the top plate element 32 with its bottom face 50 constitutes an unlocking abutment for the bolt 12 in cooperation with the top face 48 of the slider 26. Similarly, the lower plate element 34 with its top face 54 (which is in facing relationship with the bottom face 50 of the top plate element 32) constitutes a locking abutment for the bolt 12, in cooperation with the lower face 53 of the slider 26.

A compression spring 53 is arranged between the base 45 of the bore 44 in the slider 26, and the top face 54 of the lower plate element 34 of the bolt 12. In this way, when the slider 26 is put into axial downward motion, it drives the bolt 12 with it towards the locked position of the latter.

If the bottom end 14 of the bolt 12 is not in register, i.e. in facing relationship, with any of the recesses 15 in the steering shaft 16, then when the slider 26 is displaced axially downwards, the lower end 14 of the bolt 12 engages against the side face 17 of the steering shaft 16, and is unable to continue its course of travel. This situation is shown in FIG. 1B. The slider 26 is preferably made to be able to continue its downward displacement due to the interposed compression spring 53, as far as its position that corresponds to the normal locked position of the bolt 12, the spring 53 becoming compressed during this continued displacement of the slider. The steering shaft 16 then only needs to be rotated about its axis until one of the recesses 15 comes into facing relationship with the free end 14 of the bolt 12, for the latter to be urged by the compression spring 53 into the recess 15, thus immobilising the steering shaft 16 against rotation. This position is shown in FIG. 1C.

Improved means are provided for precisely and reliably determining the unlocked position of the bolt 12 with respect to the drive rod 22. For this purpose, the threaded portion 24 of the drive rod is extended at its upper end by a smooth portion 56, the diameter of which is less than the inside diameter of the internal thread 28 in the slider 26.

Thus, when the motor 18 is energised so as to cause the slider 26 to slide upwards along the threaded portion 24 of the drive rod 22, there occurs an instant at which the lower end 58 of the internal thread 28 reaches the level of the upper end 60 of the threaded portion 24.

The internal thread 28 then lies in radial facing relationship with the smooth upper portion 56, of reduced diameter, of the drive rod 22, so that there can no longer be any meshing between the drive rod 22 and the slider 26. In addition, if the motor 18 is energised for any longer in the direction which would tend to cause the slider 26 to be moved upwards, this further upward movement will not in fact happen because the slider thread 28 and rod thread 24 are now disengaged from each other, the thread 28 being merely in axial engagement against the top end 60 of the thread of the threaded portion 24.

In this way, uncertainty as to the position of the slider 26 with respect to the drive rod 22 cannot exceed the value of one pitch of the threads 24 or 28, and this is true regardless of the angular position at which the motor 18 stops.

A compression spring 62 is interposed between the top face 64 of the bolt 12 and a radial collar 66, which is formed on the drive rod 22 above the smooth portion 56 of the latter having a reduced diameter. Thus, when the slider 26 is in its disengaged position shown in FIG. 1A, the spring 62 urges the bolt 12 axially downwards against the slider 26, on the one hand, and, on the other hand, urges the lower end 58 of the internal thread 28 of the slider 26 against the upper end 60 of the threaded portion 24 of the drive rod 22.

As a result, when the motor 18 is energised so as to rotate in the direction that causes the slider 26 to be moved downwards, reliable positive meshing of the internal thread 28 with the threaded portion 24 is ensured before the motor shaft 20 has performed a complete revolution. Once the mesh has been made, the slider 26 moves axially downwards along the threaded portion 24.

The two compression springs 53 and 62, which are interposed between the bolt 12 on the one hand and the slider 26 and radial collar 66 on the other, therefore both have the effect of exerting a downward axial thrust on the bolt 12. This is of particular advantage in the situation shown in FIG. 1B, in which the bolt 12 is not in register with any recess 15 in the steering shaft. In this connection, the combined action of these two springs ensures rapid engagement of the lower end 14 of the bolt 12 in an appropriate recess 15 once the latter comes into register with the bolt 12.

In the embodiment shown in the drawings, the locked position of the bolt 12 shown in FIG. 1C is determined by the engagement of the lower axial end 14 of the bolt 12 against the base of the recess 15. Thus, when the bolt is in its locked position, there is a clearance between the lower face 50 of the upper plate element 32 of the bolt 12 and the upper face 48 of the slider 26.

However, it can be arranged that this locked position of the bolt 12 is determined by the position of the slider 26, in which case it is necessary to provide deeper recesses 15 in the steering shaft 16. The two compression springs 53 and 62 then combine their actions so as to urge the upper plate portion 32 of the bolt 12 against the upper face 48 of the slider 26. In that case, the lower position of the slider 26, and therefore the locked position of the bolt 12, can be determined by providing an arrangement similar to that described for determining the disengaged upper position of the slider 26.

What is claimed is:

1. A motorized steering lock for a motor vehicle having a steering column including a transmission shaft formed with at least one recess, the steering lock comprising:

an electric motor;

a drive rod coupled with the electric motor so as to be driven by the motor in rotation, the drive rod defining an axis and having a first drive thread;

a bolt coupled with the drive rod for sliding movement of the bolt in the direction of the axis between a locked position in which the bolt is at least partially received in said at least one recess of the steering column shaft, whereby to immobilize the steering column shaft against rotation, and an unlocked position in which the bolt is free of the at least one recess, whereby the bolt is displaceable between said locked and unlocked positions by the motor through the interposed drive rod;

a control slider having a second drive thread and mounted on the drive rod for cooperation between said first and second drive threads; and means engaging the slider so as to prevent rotation of the slider on the drive rod, whereby rotation of the drive rod rotates the first drive thread so causing the slider to be displaced in straight-line motion along the axis by cooperation with said second drive thread, the bolt defining a locking abutment and an unlocking abutment for cooperation with the slider whereby the slider can displace the bolt towards said locked and unlocked positions respectively, wherein the drive rod further comprises:

a first portion formed with said first drive thread; and a second portion adjacent to the first portion at at least one of the axial ends of the first portion, the second portion having a diameter smaller than the internal diameter of said second drive thread, said locking and unlocking abutments being spaced apart by an amount sufficient to enable the slider to be displaced with respect to the drive rod to a disengaged position, in which the second drive thread is disengaged from driving engagement with said first drive thread so that, when the drive rod is driven in a first direction of rotation, the slider can slide axially with respect to the drive rod to the disengaged position, whereby continued rotation of the drive rod in the first direction is without any effect on the slider, said disengaged position of the slider being a first end position corresponding to the locked and unlocked positions.

2. A lock according to claim 1, further including resilient biasing means engaged with the slider for urging the second drive thread, in said first end position of the slider, into axial endwise abutment against the threaded first portion of the drive rod.

3. A lock according to claim 2, wherein the first portion of the drive rod is disposed below the second portion thereof, the disengaged position of the slider corresponding to the unlocked position of the bolt, the bolt having an upper face, the second drive thread having a lower end, the threaded first portion of the drive rod having an upper end, the lock further including a radial collar formed coaxially on the drive rod above the second portion of the drive rod, the resilient biasing means being a compression spring interposed between the upper face of the bolt and the collar, whereby to urge the lower end of the second drive thread of the slider resiliently into said axial endwise abutment against the upper end of the first drive thread of the drive rod.

4. A lock according to claim 1, further including a resiliently deformable element interposed between the slider and the locking abutment, so as to be deformed elastically when the slider is displaced towards the end position corresponding to the locking position of the bolt when the bolt is out of register with any said recess in the steering column transmission shaft.

5. A lock according to claim 4, wherein the resiliently deformable element is arranged to force the bolt towards the locking position of the bolt in said at least one recess in the steering column transmission shaft when the transmission shaft is rotated to bring said at least one recess into register with the bolt.

6. A lock according to claim 5, wherein the bolt includes an upper plate element and a lower plate element defining a window between the plate elements, said plate elements lying at right angles to the axis, each said plate element having a hole, the drive shaft being received in the holes, the upper plate element defining a lower face and the lower plate element defining an upper face, the slider having an upper face and a lower face, the slider being received in the window between the lower and upper faces of the upper and lower plate elements, whereby the lower face of the upper plate element constitutes the unlocking abutment for cooperation with the upper face of the slider, and the upper face of the lower plate element of the bolt constitutes the locking abutment for cooperation with the lower face of the slider, the resiliently deformable element being a compression spring mounted between and bearing on the lower plate element of the bolt and the lower face of the slider.

7. A lock according to claim 1, wherein the motor has an output shaft having a free end, the drive rod being mounted coaxially on the free end, the motor being disposed above the bolt.

8. A motorized steering lock for a motor vehicle having a steering column including a transmission shaft formed with at least one recess, the steering lock comprising:

means for rotating a drive rod driven by an electric motor, the drive rod defining an axis and having a first drive thread, whereby rotation of the drive rod rotates the first drive thread;

means for engaging a control slider having a second drive thread, said control slider mounted on the drive rod through cooperation between the first and second drive threads;

means for preventing rotation of the control slider on the drive rod;

means for displacing the slider in straight-line motion along the axis between an unlocking abutment and a locking abutment defined by a bolt, whereby rotation of the drive rod displaces the slider;

means for displacing the bolt in the direction of the axis from an unlocked position in which the bolt is free of the at least one recess toward the recess;

means for aligning the bolt with the recess in the transmission shaft;

means for mating the bolt with the recess to prevent rotation of the transmission shaft;

means for reversing the direction of rotation of the drive rod;

means for displacing the slider to a disengaged position with respect to the drive rod in which the second drive thread is disengaged from the first drive thread, whereby the bolt is carried out of mating engagement with the recess; and means for discontinuing displacement of the bolt when the slider reaches the disengaged position, whereby continued rotation of the drive rod is without any effect on the slider.

9. A lock according to claim 8, further comprising means for urging the bolt into the at least one external recess by compression of a biasing means.

* * * * *